(12) United States Patent
Kim et al.

(10) Patent No.: US 8,467,644 B1
(45) Date of Patent: Jun. 18, 2013

(54) LIGHT GUIDE ASSEMBLY FOR A RADIATION DETECTOR

(75) Inventors: Chang Kim, Waukesha, WI (US); David McDaniel, Waukesha, WI (US); Gary McBroom, Dousman, WI (US)

(73) Assignee: General Electric Company, Schenectady, NY (US)

( * ) Notice: Subject to any disclaimer, the term of this patent is extended or adjusted under 35 U.S.C. 154(b) by 47 days.

(21) Appl. No.: 13/338,704

(22) Filed: Dec. 28, 2011

(51) Int. Cl.
*G02B 6/26* (2006.01)
*G02B 6/42* (2006.01)
*G02B 6/00* (2006.01)

(52) U.S. Cl.
USPC .............................. 385/39; 385/147; 362/610

(58) Field of Classification Search
USPC ................... 362/610, 615, 628, 341, 296.08, 362/559, 581, 446, 58; 385/37, 39, 41, 147, 385/900, 901, 146; 250/208.1, 366, 367, 250/363.01, 363.03; 359/853; 352/81; 353/94, 353/31, 37, 98, 838; 341/22
See application file for complete search history.

(56) References Cited

U.S. PATENT DOCUMENTS

| | | | |
|---|---|---|---|
| 5,451,789 A * | 9/1995 | Wong et al. | 250/363.03 |
| 6,362,479 B1 * | 3/2002 | Andreaco et al. | 250/366 |
| 6,407,392 B1 | 6/2002 | Tsuyuki et al. | |
| 6,685,328 B1 * | 2/2004 | Hanson et al. | 362/610 |
| 6,880,948 B2 * | 4/2005 | Koch et al. | 362/600 |
| 7,088,901 B2 | 8/2006 | Kim et al. | |
| 7,164,136 B2 | 1/2007 | Aykac et al. | |
| 7,475,992 B2 * | 1/2009 | Abu-Ageel | 353/31 |
| 7,601,963 B2 * | 10/2009 | Aykac et al. | 250/370.11 |
| 7,718,972 B2 | 5/2010 | Tsuda et al. | |
| 8,264,678 B2 * | 9/2012 | Souchkov et al. | 356/141.2 |
| 8,304,738 B2 * | 11/2012 | Gagnon et al. | 250/368 |
| 2002/0024803 A1 * | 2/2002 | Adachi et al. | 362/31 |
| 2003/0202363 A1 * | 10/2003 | Adachi et al. | 362/558 |
| 2007/0051811 A1 * | 3/2007 | Chiang et al. | 235/454 |
| 2010/0014027 A1 * | 1/2010 | Li et al. | 349/65 |
| 2011/0024023 A1 | 2/2011 | Tonami et al. | |
| 2011/0114845 A1 | 5/2011 | Gagnon et al. | |
| 2011/0121184 A1 | 5/2011 | Inadama et al. | |

* cited by examiner

*Primary Examiner* — Akm Enayet Ullah (57) ABSTRACT

A method of fabricating a light guide assembly includes the steps of providing an array of generally frustum-shaped light guides made of a light-transmissive material, providing an optical isolation frame of interconnected slats made of an opaque material, wherein the slats are arranged and profiled to correspondingly match the gaps between the light guides and the outer gap around the periphery of the light guide array, and bonding the light guide array and the optical isolation frame to each other.

20 Claims, 11 Drawing Sheets

LIGHT GUIDE ASSEMBLY FOR A RADIATION DETECTOR

BACKGROUND OF THE INVENTION

The present invention relates generally to light guides for radiation detectors, and more particularly to methods of manufacturing, and articles of manufacture produced thereby, for light guides for radiation detectors used in medical or other imaging.

Figure 1:
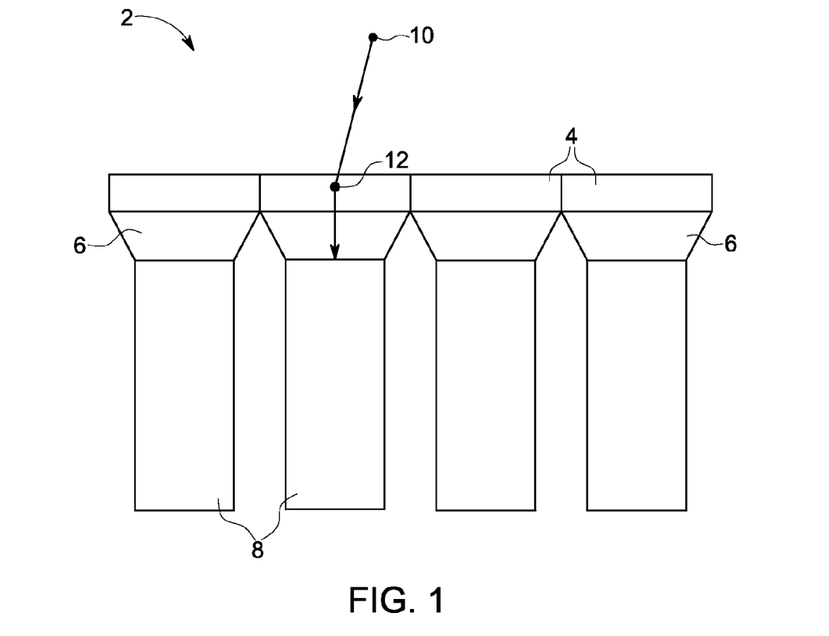
FIG. 1 is a schematic view of a scintillator/photosensor-based radiation detector according to the prior art.

FIG. 1 shows a conventional scintillator-based radiation detector, such as may be used in positron emission tomography (PET). The detector 2 comprises a set of scintillator crystals 4 optically coupled to respective photomultiplier tubes (PMTs) or other types of photosensors, for example, photodiodes, avalanche photodiodes (APDs), Geiger mode APDs, silicon photomultipliers (SiPMs), electron multiplying charge coupled devices (EMCCDs), pin diodes, etc. 8 via individual light guides 6. The scintillators 4 may be made of suitable crystals such as bismuth germanate (BGO), lutetium oxyorthosilicate (LSO), barium fluoride ($BaF_2$) or the like which emit visible, ultraviolet or other detectable light when struck with high-energy gamma photons, such as the 511 keV coincidence photons detected in PET diagnostic imaging. As shown in FIG. 1, when a gamma photon is emitted from point 10 (e.g., from within the body of a patient who has been injected with a positron- or gamma-emitting radiopharmaceutical), the photon may strike and be stopped (absorbed) by the scintillator 4 at point 12, which causes detectable light to be emitted (i.e., the scintillator will "scintillate"). The light guide 6, which may be made of optical glass, plastic or other suitable material, conveys the detectable light to its respective photosensor 8. The photosensors collect these scintillation "counts" over time, which the PET system uses to later construct images showing the distribution and concentration of radiopharmaceutical throughout the patient's body.

Figure 2:
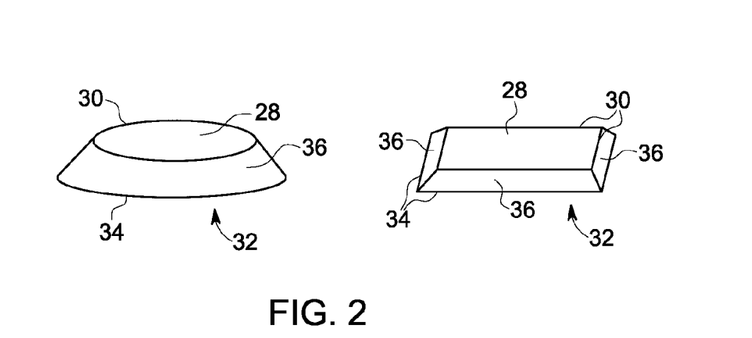
FIG. 2 shows perspective views of two frustum-shaped light guides according to the prior art.

As illustrated in FIG. 2, individual light guides 6 are typically frustum-shaped (i.e., like a cone or pyramid truncated by a plane that is parallel to the cone/pyramid base). (Note that the light guides shown in FIG. 2 are oriented upside-down from the orientation illustrated in FIG. 1.) This frustum shape accommodates the size and shape of the scintillators 4 which abut one surface 32 of the light guide 6, as well as the typically smaller size and shape of the photosensors 8 which abut the opposite surface 28. One difficulty experienced with assembling PET or other scintillation detectors is handling and mounting the large number of individual light guides 6. For example, in a single 3×4 detector module, twelve individual light guides must be handled and mounted; multiplying this by the typically large number of modules used in a PET system, it becomes clear how challenging it is to handle and mount such a large number of individual light guides. Added to this, there is the additional challenge of making sure all the individual light guides are aligned properly and consistently. Furthermore, with the repeated handling of numerous individual light guides, there is increased likelihood that the human assemblers may damage or misalign the light guides, thus potentially compromising scintillation count rates, consistency and image quality.

It would be desirable, therefore, to provide an improved way of manufacturing and assembling light guides for PET/radiation detectors which avoids or minimizes the drawbacks mentioned above.

SUMMARY OF THE INVENTION

In one embodiment of the present invention, there is provided a method of fabricating a light guide assembly, comprising the steps of providing an array of generally frustum-shaped light guides made of a light-transmissive material, providing an optical isolation frame of interconnected slats made of an opaque material, wherein the slats are arranged and profiled to correspondingly match the gaps between the light guides and an outer gap around the periphery of the light guide array, and bonding the light guide array and the optical isolation frame to each other such that the slats in the optical isolation frame are disposed within corresponding gaps in the light guide array.

The light guide assembly has a top planar surface and a bottom planar surface generally parallel to the top surface, and each light guide within the array has a first major planar surface having a first surface area and a first edge thereabout, a second major planar surface generally parallel to the first surface and having a second surface area which is greater than the first surface area, with a thickness T between the first and second surfaces. The light guide array is bounded by the top planar surface, the bottom planar surface and a peripheral boundary extending about the light guides generally perpendicularly between the top and bottom planar surfaces, with the light guides being arranged with their first and second surfaces disposed coplanar with the top and bottom planar surfaces, respectively, so as to provide an inner gap between adjacent light guides. Each inner gap has a generally triangular or generally trapezoidal gap profile and a spacing S as measured between the first edges of the adjacent light guides. The outer gap around the periphery of the outermost light guides is defined by the plane of the top planar surface, the outer sides of the outermost light guides and the peripheral boundary.

In another embodiment of the present invention, the step of providing a light guide array or the step of providing an optical isolation frame may be performed simultaneously with the step of bonding the array and frame together, such as by injection over-molding. For example, light guide array may be injection molded, and then the optical isolation frame may be injection over-molded onto the light guide array, or vice versa, so as to bond the light guide array and the optical isolation frame to each other.

In yet another embodiment of the present invention, the steps of providing the array and frame may be performed separately, and the step of binding them together may be done by using adhesive, mechanical interlocking or ultrasonic welding.

In still another embodiment, which may be combined with any of the foregoing embodiments, one or more trenches may be formed in the bottom planar surface of the light guide assembly, wherein each trench runs along and is generally centered with respect to a respective one of the inner gaps, and wherein each trench extends to a depth at least reaching the optical isolation frame. The trench surfaces may then be covered or coated with a reflective material.

Instead of or in addition to the use of trenches, another embodiment comprises the step of placing an opaque barrier on the bottom planar surface of the light guide assembly along each inner gap between adjacent light guides.

In any or all of the above embodiments, one or more of the following further descriptions may apply. The thickness of the outer gap and the corresponding slats as measured along the plane of the top planar surface may be about ½ S. A substantially reflective layer may be disposed between the light guides and the frame slats for reflecting light back into the light guides. The peripheral boundary may intersect the plane of the bottom planar surface to form a polygon circumscribing the outer edges of the second major planar surfaces of the outermost light guides. The optical isolation frame may comprise one or more inner slats each corresponding to a respective inner gap and one or more outer slats corresponding to the outer gap, wherein each inner slat has a generally isosceles triangular or generally isosceles trapezoidal inner slat profile and each outer slat has a generally right triangular or generally semi-trapezoidal outer slat profile.

DETAILED DESCRIPTION OF THE INVENTION

The foregoing summary, as well as the following detailed description of certain embodiments of the present invention, will be better understood when read in conjunction with the appended drawings. It should be understood that the various embodiments are not limited to the arrangements and instrumentality shown in the drawings.

Figure 3:
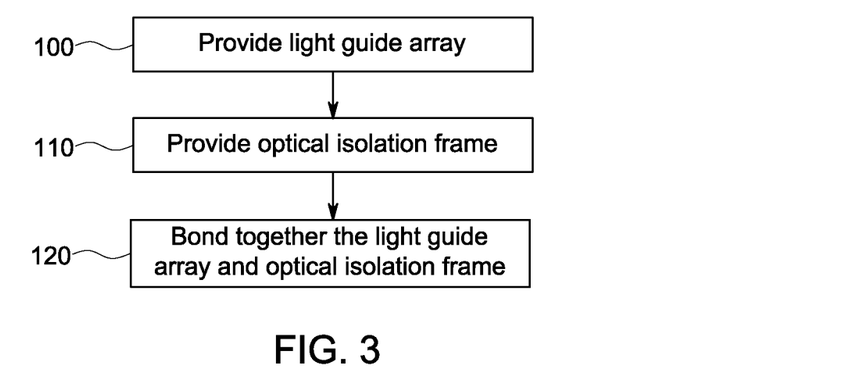
FIGS. 3-5 show flowcharts of various methods according to embodiments of the present invention.
Figure 6:
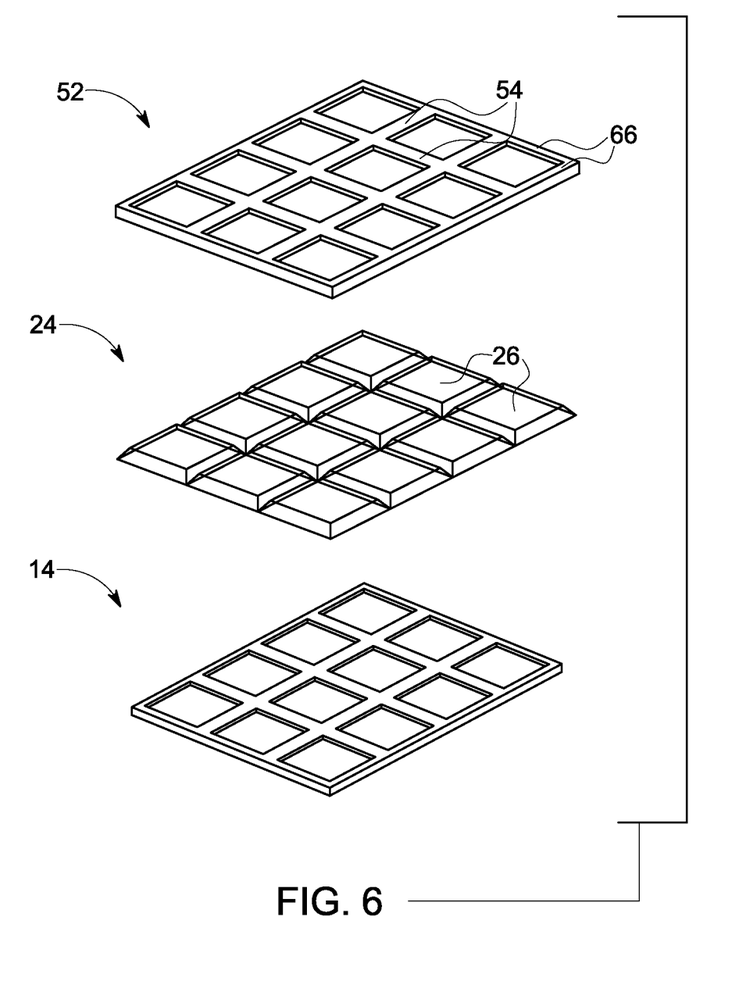
FIG. 6 shows an exploded perspective view of an optical isolation frame, a light guide array and an assembled light guide assembly according to embodiments of the present invention.
Figure 7:
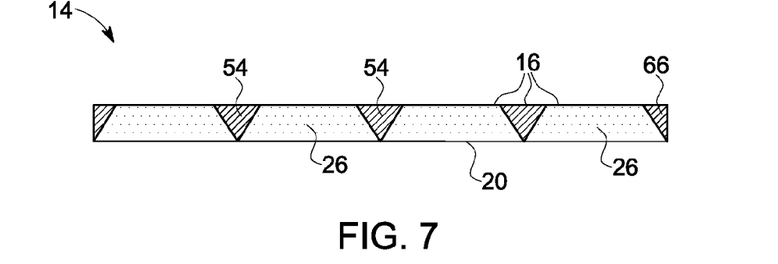
FIG. 7 shows a sectional side view of a light guide assembly according to an embodiment of the present invention.
Figure 8:
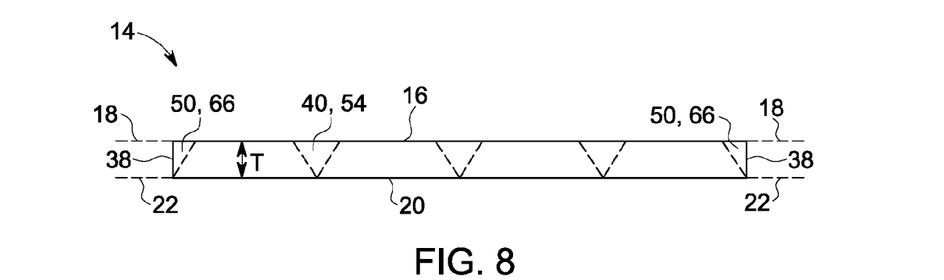
FIG. 8 shows a side view of a light guide assembly according to an embodiment of the present invention.

To assist the reader in understanding the embodiments of the present invention that are disclosed, all reference numbers used herein are summarized below, along with the elements they represent:

2 Detector
4 Scintillator
6 Light guide
8 Photosensor (e.g., PMT, APD, etc.)
10 Origination point of gamma photon
12 Stopping/scintillation point of gamma photon
14 Light guide assembly
16 Top planar surface of light guide assembly (facing the photosensors)
18 Plane of top planar surface
20 Bottom planar surface of light guide assembly (facing the scintillators)
22 Plane of bottom planar surface
24 Array of light guides
26 Individual light guide
28 First major planar surface (facing the photosensors)
30 First edge (about the first/photosensor-facing surface)
32 Second major planar surface (facing the scintillators)
34 Second edge (about the second/scintillator-facing surface)
36 Side of individual light guide
38 Peripheral boundary (about the outer light guides)
40 Inner gap
42 Isosceles triangular profile (gap/slat)
44 Isosceles trapezoidal profile (gap/slat)
46 Right triangular profile (gap/slat)
48 Semi-trapezoidal profile (gap/slat)
50 Outer gap
52 Optical isolation frame
54 Inner slat
56 Base of inner slat
58 Side of inner slat
60 Apex/ridgeline of inner slat
62 Apex/plateau of inner slat
64 Projected apex of inner slat
66 Outer slat
68 Base of outer slat
70 Inner side of outer slat
72 Outer side of outer slat/outer side of frame
74 Apex/ridgeline of outer slat
76 Apex/plateau of outer slat
78 Projected apex of outer slat
80 Trench
82 Inner walls/surfaces of trench
84 Reflective material (covering/coating/filler)
86 Opaque barrier
88 Runner
90 Reflective layer/barrier/surface
100-150 Method steps
D Depth of trench
$H_a$ Actual height of inner/outer slat (and actual depth of gap)
$H_p$ Projected height of inner/outer slat (and projected depth of gap)
S Spacing between light guide edges on photosensor/top side
T Thickness of light guide array/light guide assembly Referring now to the drawings, FIG. 3 shows a method according to an embodiment of the present invention, for fabricating a light guide assembly as illustrated in FIGS. 6-8. The light guide assembly 14 has a top planar surface 16 (for interfacing with photosensors) and a bottom planar 20 surface generally parallel to the top surface (for interfacing with scintillators). The method of FIG. 3 comprises the steps of: (100) providing an array 24 of generally frustum-shaped light guides 26 made of a light-transmissive material; (110) providing an optical isolation frame 52 comprising a frame of interconnected slats 54/66 made of an opaque material, wherein the slats are arranged and profiled to correspondingly match the gaps 40 between the light guides 26 and an outer gap 50 around the periphery of the light guide array 24; and (120) bonding the light guide array 24 and the isolation frame 52 to each other such that the slats 54/66 in the isolation frame are disposed within their corresponding gaps 40/50 in the light guide array.

Each light guide 26 within the array 24 has a first major planar surface 28 (facing the photosensors when used in a detector) having a first surface area and a first edge 30 thereabout, a second major planar surface 32 (facing the scintillators when used in a detector) generally parallel to the first surface 28 and having a second surface area which is greater than the first surface area. A thickness T of the light guides/array 26/24 is measured between the first and second surfaces 28/32. The light guide array 24 is bounded by the top planar surface 16, the bottom planar surface 20 and a peripheral boundary 38 extending about the light guides 26 generally perpendicularly between the top and bottom planar surfaces 16/20, with the light guides 26 being arranged with their first and second surfaces 28/32 disposed coplanar with the top and bottom planar surfaces 16/20 of the overall assembly 14, respectively, so as to provide an inner gap 40 between adjacent light guides. Due to the generally frustum-shaped geometry of the light guides 26, each inner gap 40 has a generally triangular or generally trapezoidal gap profile, with a spacing S as measured between the first edges 30 of adjacent light guides 26. The outer gap 50 around the periphery of the outermost light guides 26 is defined by the plane 18 of the top planar surface 16, the outer sides 36 of the outermost light guides 26 and the peripheral boundary 38.

It should be noted that as used herein, the use of the word "inner" with regard to gaps and slats 40/54 refers to those which are disposed between adjacent light guides, whereas "outer" gaps and slats 50/66 refers to those around the periphery or perimeter of the light guide array 24 and not disposed between adjacent light guides 26. Additionally, in some light guide assembly 14 configurations, an "inner" gap or slat 40/54 can be viewed not only as running between just two adjacent light guides 26, but also along two adjacent rows of light guides 26. For example, the 3×4 frame 52 in FIG. 6 can be viewed as having seventeen inner slats under the view that an inner slat is between (only) two adjacent light guides 26, but it can also be viewed as having five inner slats (two running in an x-direction, and three in the y-direction, so to speak) under the view that an inner slat is between two adjacent rows of light guides 26. "Inner" and "outer" can also be used to describe individual light guides 26 within an array 24 as well. Again referring to FIG. 6 as an example, the array 24 shown has two inner light guides 26, surrounded by ten outer light guides 26. Thus, generally speaking, "inner" may refer to elements, directions or orientations toward the center or centroid (e.g., of an array), whereas "outer" may refer to elements, directions or orientations outward from the center or centroid. Consequently, "outermost" light guides 26 would be those which are on the outer periphery of an array 24. For example, in a 5×5 (non-interleaved) rectangular array 24, there would be sixteen "outermost" light guides 26, while in a simple 1×2 array, both light guides would technically be considered as "outermost".

Figure 9:
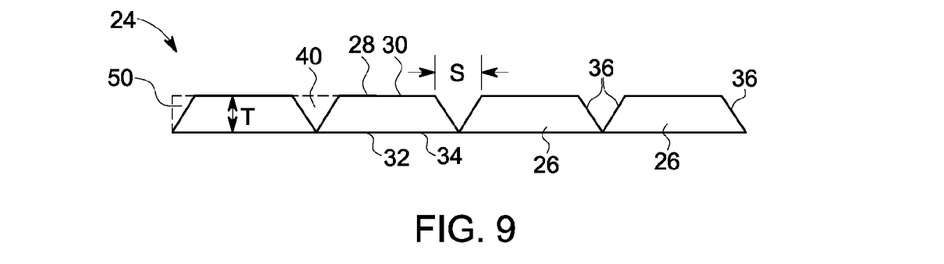
FIG. 9 shows a side view of a light guide array according to an embodiment of the present invention.

As shown in FIG. 9, the array 24 of light guides 26 provides inner gaps 40 between adjacent light guides 26. (Or, said another way, the inner grooves 40 formed in the top surface 16 define the individual light guides 26 on either side thereof.) These gaps 40 are bounded and defined by the sides 36 of their adjacent light guides and by the plane 18 of the top planar surface 16, which is generally coplanar with the first (photosensor-facing) surfaces 28 of the light guides 26. The outer gaps 50 (formed in the top surface 16 about the perimeter of the top portion 25) are bounded and defined generally by three planes or surfaces: the outer sides 36 of the outermost light guides 26, the plane 18 of the top planar surface 16, and the peripheral boundary 38. The light guides 26 of the array 24 may be contiguous with one another (e.g., to provide a single unitary structure for easier handling), or they may be non-contiguous with a small gap or spacing between adjacent light guides 26. For example, the light guides 26 can be made as individual units, and can then be assembled together with the desired arrangement and spacings therebetween. Alternatively, the light guides 26 can be made simultaneously, such as by being formed by injection molding or casting in a mold wherein they are formed with the desired arrangement and spacing built into the mold design, thereby avoiding the need for separate handling and arrangement for subsequent processing (as will be described further below). Or, a blank of light-transmissive material, such as the rectangular block shown in FIG. 10, can be machined, etched or otherwise processed to create the gaps 40/50, thereby providing a light guide array 24. Thus, the array 24 can be produced by additive processing (e.g., injection molding, casting), subtractive processing (e.g., machining, etching), or combinations thereof.

The light-transmissive material which the light guides/light guide array 26/24 are made of may be any suitable material which can convey detectable light from a scintillator to a photosensor. For example, the light transmissive material may be optical glass, borosilicate glass, quartz, plastic (e.g., acrylic, polycarbonate, polystyrene) or the like. Depending on the wavelengths that are detectable by the photosensors chosen, the light-transmissive material may appear optically transparent (e.g., if the wavelengths are visible light) or not (e.g., if the wavelengths are not visible light, such as ultraviolet, infrared, etc.).

Figure 10:
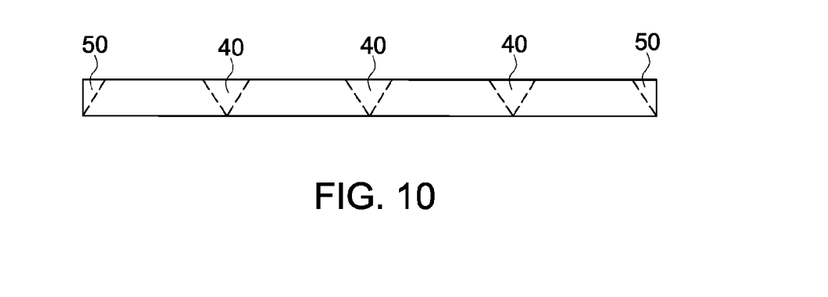
FIG. 10 shows a side view of a blank of light-transmissive material which can be processed to form a light guide array according to an embodiment of the present invention.

FIGS. 9-10 show the inner gaps 40 having an inverted, generally triangular-shaped profile. In these figures, the second (scintillator-facing) surface 32 of each light guide 26 has a circumferential or perimetral edge 34 about this surface 32. For generally frusto-conical light guides 26, this edge 34 would generally be in the form of a circle, whereas for generally frusto-pyramidal light guides 26 this edge 34 would be in the form of a polygon (e.g., generally rectangular). As illustrated in FIGS. 9-10, the depth of each inner gap 40 (as measured from the plane of surface 28) may be exactly equal to the thickness T of the array 24, thereby making the edges 34 of adjacent light guides 26 meet along lines having zero thickness. However, from a practical (e.g., manufacturing) perspective, the edges 34 of the light guides may be contiguous (i.e., the depth of the inner gaps will be less than T, and adjacent light guides will slightly "overlap" each other) or non-contiguous (i.e., the projected depth, as projected by the sides 36 of adjacent light guides 26, will be greater than T, and adjacent light guides will be slightly spaced apart from each other), as further described below.

It should be noted that while the inner gap profiles may be described as being generally triangular 42 or generally trapezoidal, it is within the scope of the present invention that the apex of each profile may be rounded or filleted (rather than being sharp or angular). Additionally, the sides 36 of the light guides 26 do not have to be straight, but may be somewhat drafted, curved or contoured, thereby causing the corresponding gaps 40 and slats 54 to likewise have a matching non-straight profile or contour. Furthermore, while frusto-conical and frusto-pyramidal shapes fit within the characterization of "generally frustum-shaped", other solid shapes may fit as well, such as shapes being rectangular or polygonal (e.g., hexagonal, triangular, etc.) at one end surface and transitioning to a circular or elliptical shape at the other end surface, shapes having rounded corners rather than sharp/angular ones, etc. Thus, the profile shapes and descriptions used herein should be construed as exemplary, and not restricted to only these exact shapes and descriptions.

Figure 11:
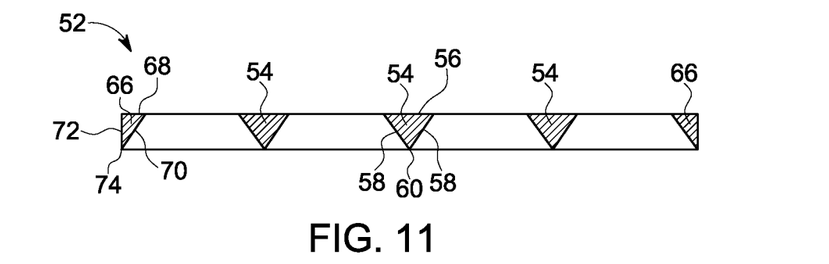
FIG. 11 shows a sectional side view of an optical isolation frame according to an embodiment of the present invention.
Figure 18:
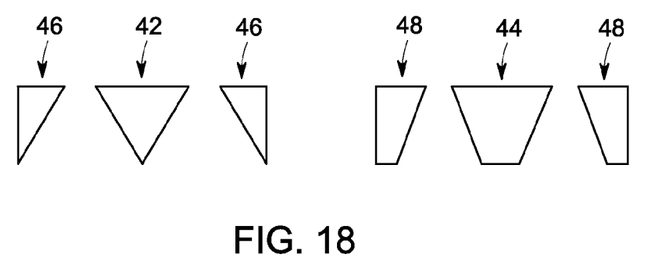
FIG. 18 shows inner and outer slat/gap profiles according to various embodiments of the present invention.

The optical isolation frame 52, shown in FIG. 11, may likewise be produced by various means, although additive processing such as injection molding or casting may be more efficient. The material and/or construction used for the optical isolation frame should be such that it is substantially opaque or/and reflective to any light of wavelengths detectable by the photosensors. Suitable materials include optical glue or plastics such as polytetrafluoroethylene (PTFE), mixed or coated with $TiO_2$, MgO, $Al_2O_3$ or $BaSO_4$. It may also be desirable to add a substantially reflective barrier or layer 90 between the interfacing surfaces of the light guides 26 and the frame 52, such that any light that strikes the sides 36 of a light guides gets reflected back into the interior of the light guide. This reflective barrier 90 may be provided on the outside surface of the frame 52 (particularly on the surfaces 58/70 facing the light guides), or substantially the entire frame may be made of a reflective material; and/or a reflective barrier or surface 90 may also be provided on the sides 36 of the light guides themselves. The reflective surface 90 may be provided by applying reflective plastic molding, reflective epoxy casting, reflective films, foils, layers, platings, coatings, etc., to the appropriate frame/light guide surfaces. (Suitable materials for the substantially reflective barrier/layer/surface 90 include those mentioned below for the reflective material 84, as well as chrome platings and the like.) Each inner slat 54 has a generally triangular or generally trapezoidal profile 42/44, so as to correspondingly match the gap 40 formed between adjacent light guides 26. Each of the inner slats 54 shown in FIG. 11 has a base 56, and two sides 58 which converge at an apex 60. Although the apex 60 appears as a point in the two-dimensional view shown by FIG. 11, in three dimensions this apex 60 would appear as a sharp ridgeline or edge. Each of the outer slats 66 has a base 68, an outer side 72 which generally forms a right angle with the base 68, and an inner side 70 which slopes from the base 68 to the distal end of the outer side 72 to form an apex or ridgeline 74. The profile 46 of the outer slat 66 illustrated here is that of a right triangle, which is essentially one-half of the inner slat profile. Alternatively, the outer slat profile 48 may be in the form of a semi-trapezoid. FIG. 18 provides a comparison of these profiles 42/44/46/48.

Figure 12:
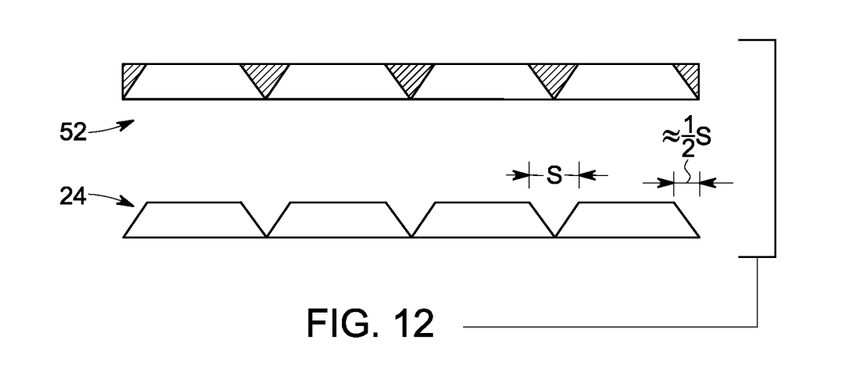
FIG. 12 shows an optical isolation frame and corresponding light guide array which may be bonded together to form a light guide assembly according to an embodiment of the present invention.

FIG. 12 shows an optical isolation frame 52 and a light guide array 24 which are aligned and ready for bonding together. The frame 52 and array 24 may be separately produced, such as by injection molding, and then joined together by the use of adhesive, mechanical interlocking (e.g., tabs, snaps, detents or the like formed in the frame 52 and/or array 24, ultrasonic welding, or other suitable means for bonding the frame 52 and array 24 to each other. Alternately, the step 100 of providing the array 24 or the step 110 of providing the frame 52 may be combined with the step 120 of bonding the frame and array together. For example, the array 24 may be formed by injection molding a light-transmissive material into a mold. Then, the mold may have slide actions which retract so that the gaps 40/50 are provided and bound by the retracted mold walls, and a second/opaque material is injected to fill the gaps 40/50, thereby forming the slats 54/66 of the frame 52. This type of dual-shot or over-molding approach causes the frame 52 and array 24 to fuse or bond together at their interfaces, thereby providing the finished light guide assembly 14. Or, the frame 52 can be injection molded in the mold first, and then the array 24 may be over-molded onto/into the frame 52. Alternately, instead of both parts 52/24 being shot in the same mold, one of them can be molded in a first mold, and then transferred into a second mold where the other part is over-molded onto/into the first part. As mentioned above, an optional reflective layer 90 may be provided on the frame sides 58/70, the light guide sides 36, or both. This layer 90 may be applied by applying a reflective film/foil, chrome or other plating, etc., and may be done at any time before the frame 52 and array 24 are bonded together.

When the light guide array 24 and the optical isolation frame 52 have been bonded together as described above and illustrated in the drawings, a light guide assembly 14 according to various embodiments of the present invention is provided. This assembly of light guides is suitable for conveying detectable light from multiple scintillators to multiple photosensors, for use in a radiation detector, such as in medical imaging/diagnostic equipment like PET or SPECT/nuclear medicine detectors.

Figure 5:
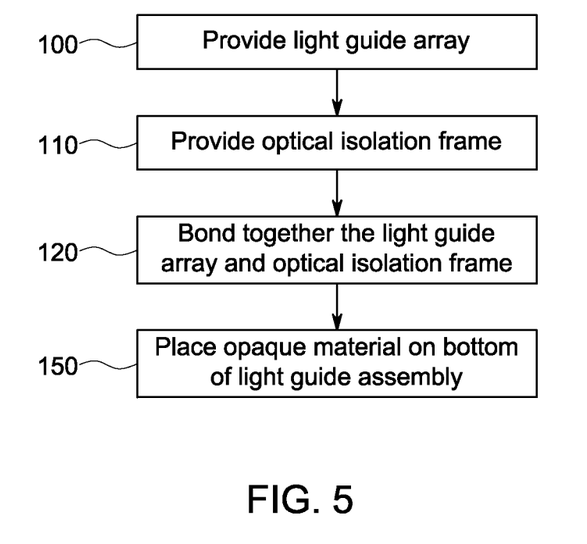
Figure 13:
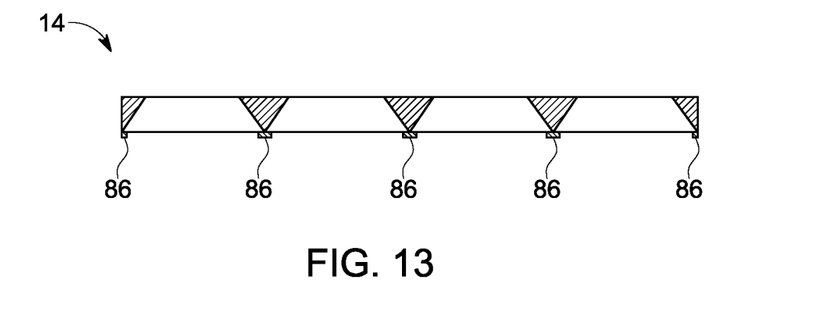
FIG. 13 shows a sectional side view of a light guide assembly according to an embodiment of the present invention, which utilizes opaque barriers.

An additional step, illustrated by FIGS. 5 and 13, can also be performed according to another embodiment of the present invention. After the steps 100/110/120 of providing the array 24, providing the frame 52 and bonding them together, an additional step 150 of placing an opaque barrier/material 86 on the bottom (scintillator-side) surface 20 of the assembly 14 can be performed. The barrier 86 serves to provide additional light isolation between adjacent light guides 26, and may be made of or coated by a material which is substantially opaque. It may also be advantageous to make the barrier 86 somewhat compressible or pliable, so that the bottom surface 20 of the light guide assembly 14 (onto which the barriers 86 are attached) may be sealably abutted or fitted against the scintillators. Suitable materials for the barriers 86 include polytetrafluoroethylene (PTFE) tape such as TEFLON-brand tape from Dupont (E. I. du Pont de Nemours and Company), other compressible tapes, compressible glues, caulks, etc. The barrier 86 may be positioned on the bottom surface 20 of the light guide assembly 14 running along each inner gap 40 or inner slat apex 60/62 between adjacent light guides 26. Barriers 86 may also be placed on the bottom surface 20 running along each outer gap 50 or outer slat apex 74/76 at the outer periphery or perimeter of the light guide assembly 14, which may help to minimize light leakage between adjacent light guides 26 in neighboring/adjacent light guide assemblies 14 (e.g., when the assemblies 14 are tiled). The barriers 86 should ideally extend across the full length of each gap/apex so as to maximize light isolation and minimize light leakage between and among adjacent light guides 26. As indicated by FIG. 13, opaque barriers 86 used on the periphery adjacent the outer slats 66 may be smaller than those used adjacent the inner slats 54 (i.e., on the order of about one-half in width, as measured across the bottom surface 20). It is desirable that each barrier 86 be as narrow as possible, in order to not interfere with light being conveyed from the scintillators to the light guides 26.

Figure 4:
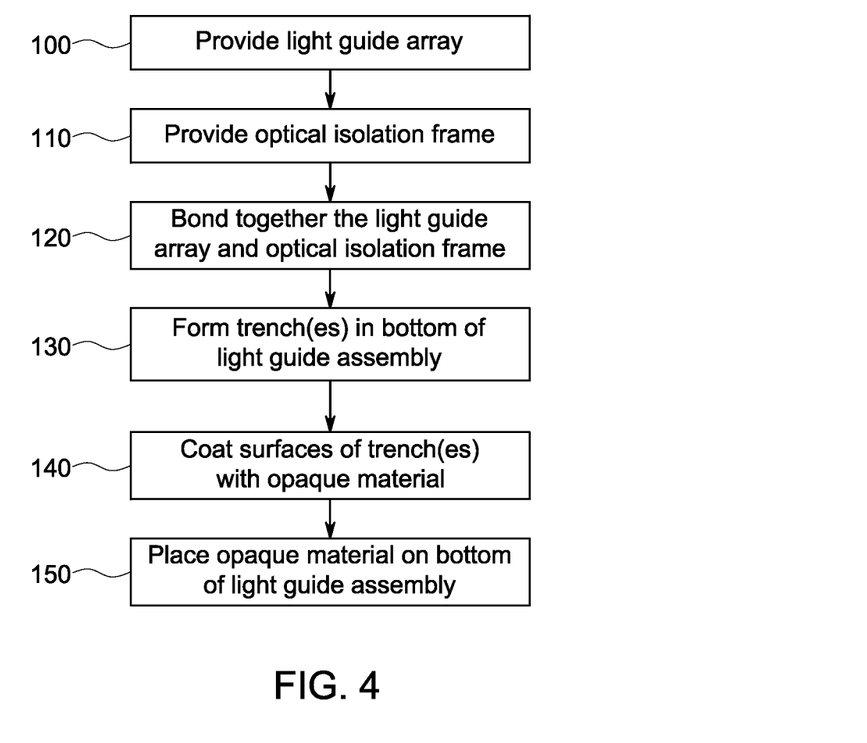
Figure 14:
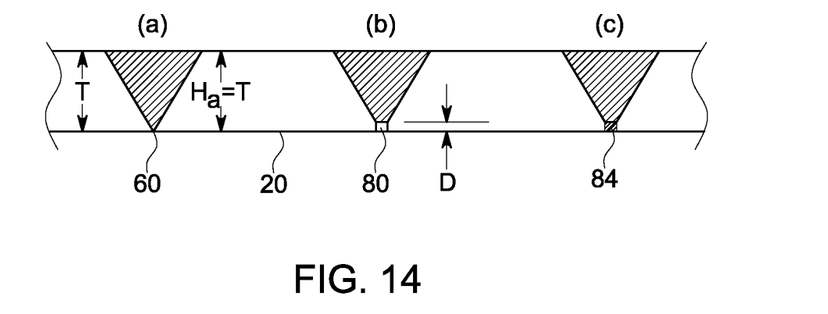
FIGS. 14-17 show sectional side views of various embodiments of the present invention, illustrating the use of trenches and reflective trench coverings/coatings/fillers.

FIGS. 4 and 14-17 illustrate yet another additional set of steps that may be performed according to a further embodiment of the present invention. After the steps 100/110/120 of providing the array 24, providing the frame 52 and bonding them together, an additional set of steps may include 130 forming one or more trenches 80 on the bottom surface 20 of the light guide assembly 14 between adjacent light guides 26, and 140 covering at least the surfaces 82 of these trenches 80 with a reflective material 84. (As used herein, "covering" can also mean one or more of coating, blocking, optically occluding, and the like, whether the reflective material 84 is adhered to the inner surfaces 82, inserted/stuffed into the trench to block the surfaces 82, or the like.) Each trench 80 may run along (and be generally centered with respect to) a respective one of the inner gaps 40 or inner slats/apexes 54/60, and may extend into the bottom surface 20 to a depth D that at least reaches the respective slat 54 of the isolation frame 52. The purpose of the reflective trenches 80 is to further minimize light leakage between adjacent light guides 26, particularly in cases where the actual height $H_a$ of the slat 54/66 is less than or equal to the overall assembly thickness T, and to reflect light that is incident on the trenches 80 back into the light guide 26 and on to the photosensor. FIG. 14 shows an arrangement where the inner slat profiles are generally triangular and $H_a$=T. Here, at view (a), there is some possibility that light from one light guide 26 may leak into an adjacent light guide, due to the thinness of the inner slat apex 60 which just reaches to the bottom surface 20 of the assembly 14. In view (b), a trench 80 has been formed immediately at the apex 60 to a depth D into the assembly 14. Most of the trench 80 has been formed into the slat 54, rather than into the light guide 26, thereby minimizing the amount of optical interference produced in the light guide 26 itself. The trench 80 may be formed by milling, etching or other suitable subtractive processes, or they may be formed in the slat and/or light guide during steps 100/110. Although FIGS. 14-17 only illustrate trenches 80 formed in the inner slats 54, they may likewise be formed in the outer slats 66 as well. In view (c), at least the inner surfaces 82 of the trench 80 are covered with a reflective material 84. More specifically, only those inner surfaces 82 through which light might otherwise leak between adjacent light guides 26 are the surfaces 82 that need to be covered. Optionally, the entire trench 80 may be filled, and the reflective filler/material 84 may even bulge outward beyond the adjacent bottom surface 20. Suitable reflective materials 84 include reflective films such as TEFLON-brand foil, VIKUITI-brand Enhanced Specular Reflector (ESR) film from 3M (Minnesota Mining & Manufacturing Co.), MYLAR-brand polyester film by Dupont, LUMIRROR-brand polyester film by Toray Industries, Inc., and other reflective materials. As shown in FIG. 4, an embodiment of the present invention may also include, in addition to steps 100-140, the step 150 of adding an opaque barrier/material 86 to the bottom 20 of the light guide assembly 14 as described above.

Figure 15:
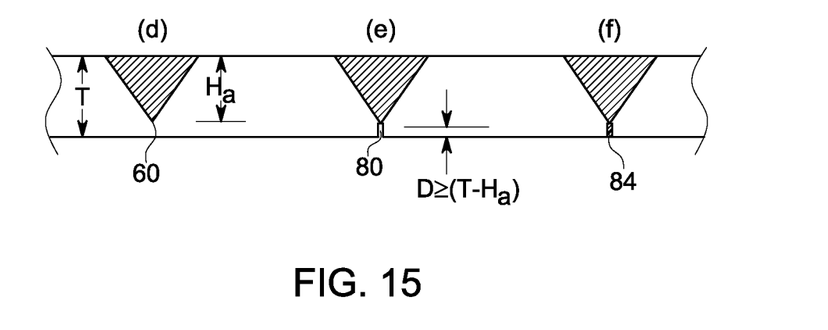
Figure 16:
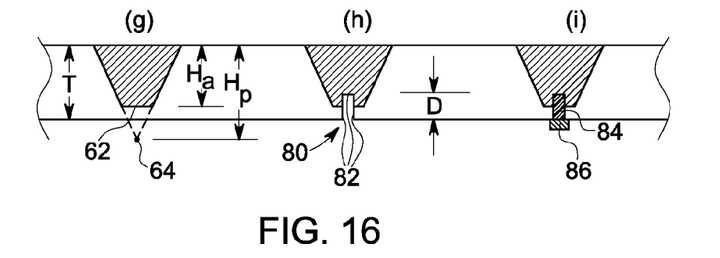
Figure 17:
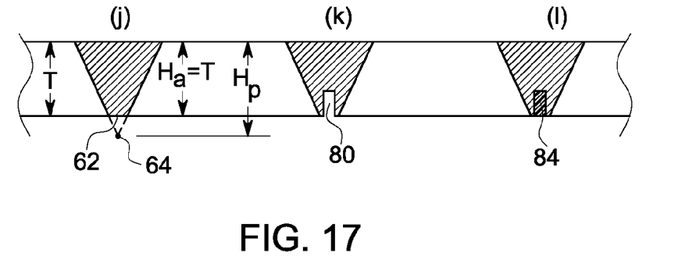

FIG. 15, at view (d), shows an arrangement where the inner slat profiles are generally triangular and $H_a$<T. Here, the light guides 26 are partially contiguous with each other, and the overall light guide array 24 is a single unitary piece (comprising multiple light guides 26 contiguated with one another). In view (e), a trench 80 is formed, to a depth D that at least reaches the corresponding slat 54 of the isolation frame 52 (i.e., D≧(T−$H_a$)). In view (f), the trench 80 and/or trench surfaces 82 are filled with reflective material 84. In FIGS. 16-17, the slat profiles are generally trapezoidal. In view (g) of FIG. 16, the sides of the slat project to a projected height $H_p$ which in this case extends beyond the bottom surface 20 of the assembly 14. In view (h), a trench 80 is formed to a depth D that extends into the slat apex. In view (i), the trench 80 is filled with reflective material 84, and an opaque barrier 86 is also added. In view (j) of FIG. 17, the sides of the slat profile project to a projected height $H_p$ that is beyond the bottom surface 20, like view (g) of FIG. 16. However, unlike view (g), in view (j) the slat apex 62 extends all the way to the bottom surface 20 (i.e., $H_a$=T). Views (k) and (l) show the forming and filling of the trench, respectively.

Figure 19:
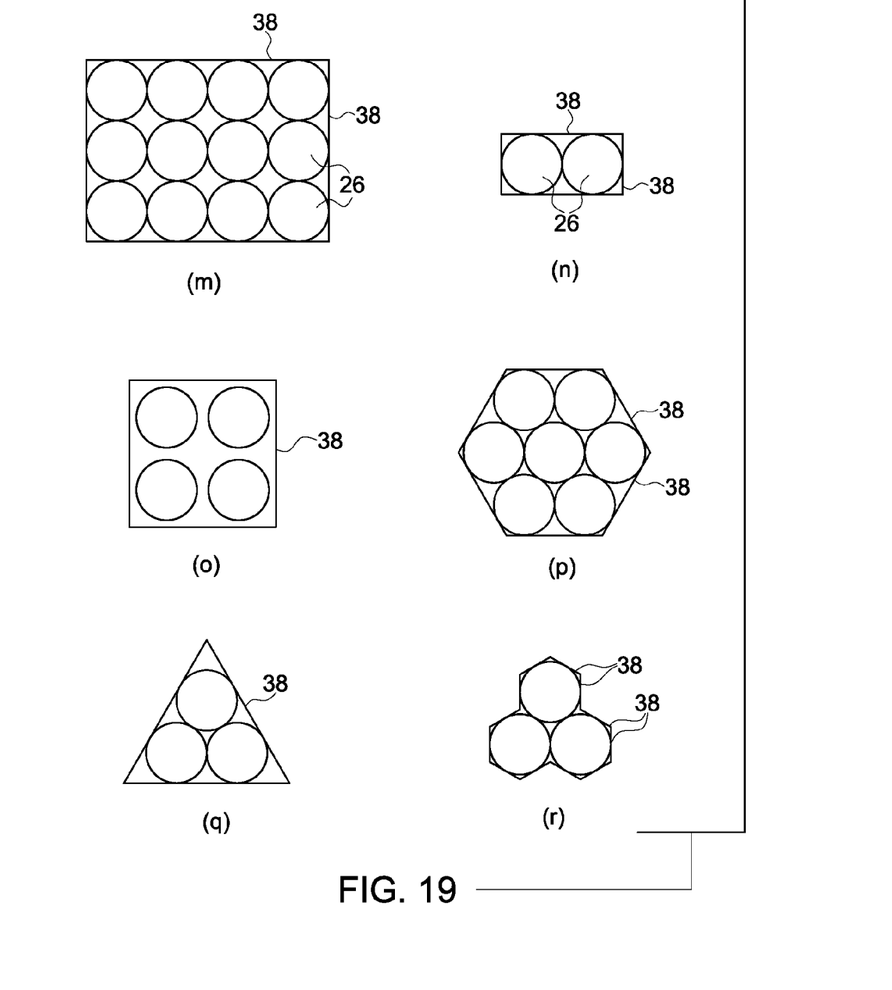
FIG. 19 shows multiple scintillator-side views of light guide assemblies according to various embodiments of the present invention
Figure 20:
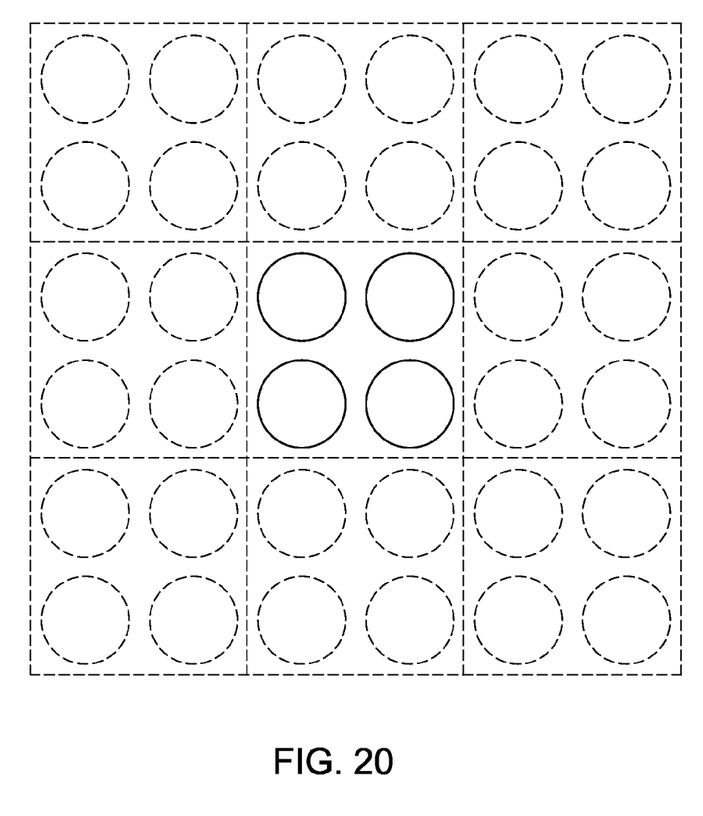
FIG. 20 shows a way of tiling together multiple light guide assemblies according to an embodiment of the present invention.

FIG. 19 shows various embodiments and configurations of light guide assemblies 14 according to the present invention. Views (m) through (r) show various bottom or scintillator-side views, in which the peripheral boundary/side walls 38 of the assembly 14 intersects the plane 22 of the bottom planar surface 20 to form a polygon generally circumscribing the outer edges 34 of the second major planar surfaces 32 of the outermost light guides 26. This can be thought of as circumscribing the "footprint" of the light guide assembly 14 (i.e., where the bottom surface 20 of the whole assembly 14 overlaps or is coplanar with plane 22). In views (m), (n) and (p) through (r), the light guides 26 are arranged together as tightly as possible, with little or no spacing between adjacent light guides, in order to maximize scintillator coverage. In view (o), the light guides 26 have been spaced apart from each other. In this case, the width of the outer slats (as seen in this view) would be approximately one-half the width of the spacing between adjacent light guides, so that when the light guide assemblies 14 are tiled together, as illustrated in FIG. 20, a uniform spacing is achieved between all adjacent light guides, even between adjacent guides 26 from neighboring assemblies 14. It should be noted that although FIG. 19 shows all the light guides 26 as having a generally circular bottom/scintillator-side surface 32 (i.e., frusto-conical), the light guides 26 may also be other shapes as well (e.g., square, rectangular).

Figure 21:
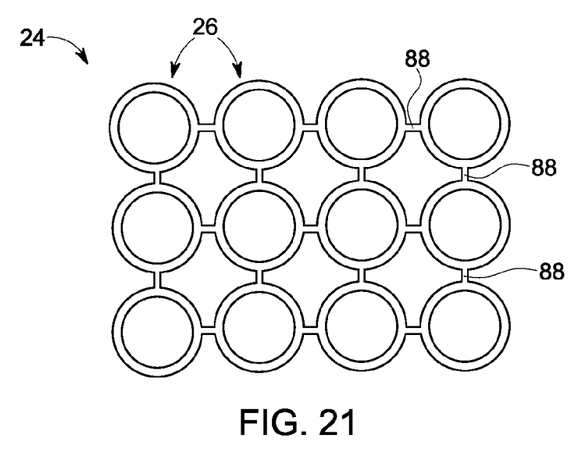
FIGS. 21-22 show photosensor-side views of light guide arrays with runners according to various embodiments of the present invention.
Figure 22:
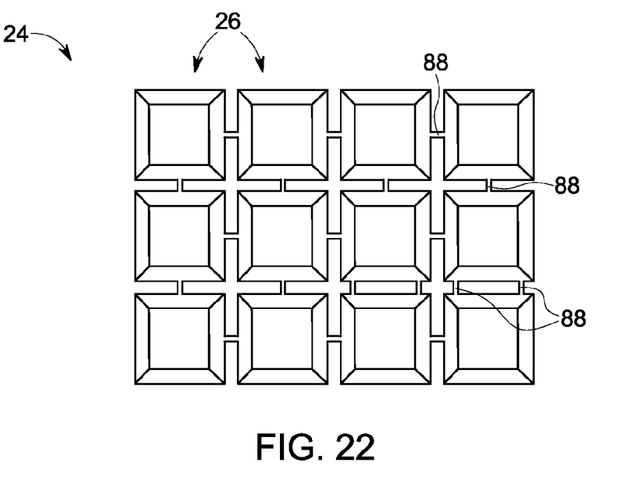

When the individual light guides 26 are spaced apart from one another as shown in view (o), it may be desirable to provide one or more runners 88 between adjacent light guides, as illustrated in FIGS. 21-22. These runners 88 may be made of light-transmissive material, and in fact may be formed during the step 100 of providing the light guide array 24. For example, a light guide array 24 having runners may be injected molded, with the runners 88 being formed in the mold with the light guides 26 as part of the same step. One benefit of providing such a network of runners 88 is that the array 24 can be handled as a single unitary piece, rather than as a collection of multiple independent pieces. Additionally, one or more of the runners 88 can be used as gate areas for injection molding. This is advantageous because having a gate opening directly into one of the light guides 26 could cause that guide 26 be occluded with defects which often occur at the gate, thereby potentially compromising the optical transparency and effectiveness of that light guide 26. Instead, the gate(s) could be placed at one or more of the runners 88, as any gate defects there would not directly affect the light guides 26. FIG. 21 illustrates an array 24 of frusto-conical light guides, with one runner 88 being shared by each couplet of adjacent light guides. FIG. 22 shows an array 24 of frusto-pyramidal light guides, with one runner 88 being shared by most couplets of the adjacent light guides, but with two runners 88 being shared by some couplets in the lower right-hand corner of the drawing. Once the array 24 is bonded with the optical isolation frame 52, optional steps may be performed of forming trenches 80 in the bottom surface to a depth which extends substantially through the runners 88, and then covering/coating at least the trench surfaces 82 with reflective material 84. This would help keep the runners 88 from allowing light to leak therethrough between adjacent light guides 26.

Various embodiments of the present invention provide a method and article of manufacture for conveying light from each of plurality of scintillators to a respective each of a plurality of photomultiplier tubes in a radiation detector. A technical effect of the various embodiments is to provide a way of providing multiple light guides 26 in a light guide assembly 14 that is more convenient, more economical and less prone to alignment errors and handling damage than conventional approaches.

The above description is intended to be illustrative, and not restrictive. While the invention has been described in terms of various specific embodiments, those skilled in the art will recognize that the invention can be practiced with modification within the spirit and scope of the claims. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to illustrate the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first", "second", "top", "bottom", etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, any references to a particular embodiment or example of the present invention are not intended to be interpreted as excluding the existence of additional embodiments or examples that also incorporate the recited features. Moreover, unless explicitly stated to the contrary, embodiments "comprising" or "having" an element or a plurality of elements having a particular property may include additional such elements not having that property.

This written description uses examples to disclose the invention, including the best mode, and also to enable those skilled in the art to practice the invention, including making and using any devices or systems thereof and performing any methods thereof. It is the following claims, including all equivalents, which define the scope of the present invention.

The invention claimed is:

1. A method of fabricating a light guide assembly having a top planar surface and a bottom planar surface generally parallel to the top surface, comprising the steps of:
   a. providing an array of generally frustum-shaped light guides made of a light-transmissive material, each light guide having a first major planar surface having a first surface area and a first edge thereabout, a second major planar surface generally parallel to the first surface and having a second surface area which is greater than the first surface area, and a thickness T between the first and second surfaces, the array being bounded by the top planar surface, the bottom planar surface and a peripheral boundary extending about the light guides generally perpendicularly between the top and bottom planar surfaces, the light guides being arranged with their first and second surfaces disposed coplanar with the top and bottom planar surfaces, respectively, so as to provide an inner gap between adjacent light guides, wherein each inner gap has a generally triangular or generally trapezoidal gap profile and a spacing S as measured between the first edges of the adjacent light guides, and wherein an outer gap around the periphery of the outermost light guides is defined by the plane of the top planar surface, the outer sides of the outermost light guides and the peripheral boundary;
   b. providing an optical isolation frame comprising a frame of interconnected slats made of an opaque material, wherein the slats are arranged and profiled to correspondingly match the respective arrangement and profiles of the inner gaps and outer gap of the light guide array; and
   c. bonding the light guide array and the optical isolation frame to each other such that the slats in the optical isolation frame are disposed within their corresponding gaps in the light guide array.

2. A method according to claim 1, wherein a substantially reflective layer is disposed between the light guides and the frame slats for reflecting light back into the light guides.

3. A method according to claim 1, wherein step (a) or (b) is performed simultaneously with step (c).

4. A method according to claim 3, wherein the simultaneous steps are performed by injection over-molding.

5. A method according to claim 1, wherein a first one of the light guide array and the optical isolation frame is injection molded, and then the other of the light guide array and the optical isolation frame is injection over-molded onto the first one so as to bond the light guide array and the optical isolation frame to each other.

6. A method according to claim 1, wherein steps (a) and (b) are performed separately and step (c) is performed by use of adhesive, mechanical interlocking or ultrasonic welding.

7. A method according to claim 1, further comprising the steps of:
   d. forming one or more trenches in the bottom planar surface of the light guide assembly, wherein each trench runs along and is generally centered with respect to a respective one of the inner gaps, and wherein each trench extends to a depth at least reaching the optical isolation frame; and
   e. covering the trench surfaces with a reflective material.

8. A method according to claim 1, further comprising the step of:
   f. placing an opaque barrier on the bottom planar surface of the light guide assembly along each inner gap between adjacent light guides.

9. A method according to claim 1, wherein the peripheral boundary intersects the plane of the bottom planar surface to form a polygon generally circumscribing the outer edges of the second major planar surfaces of the outermost light guides.

10. A method according to claim 1, wherein the frame comprises one or more inner slats each corresponding to a respective inner gap and one or more outer slats corresponding to the outer gap, wherein each inner slat has a generally isosceles triangular or generally isosceles trapezoidal inner slat profile and each outer slat has a generally right triangular or generally semi-trapezoidal outer slat profile.

11. A method of fabricating a light guide assembly having a top planar surface and a bottom planar surface generally parallel to the top surface, comprising the steps of:
   a. providing an array of generally frusto-conical and/or frusto-pyramidal light guides made of a light-transmissive material, each light guide having a first major planar surface having a first surface area and a first edge thereabout, a second major planar surface generally parallel to the first surface and having a second surface area which is greater than the first surface area, and a thickness T between the first and second surfaces, the array being bounded by the top planar surface, the bottom planar surface and a peripheral boundary extending about the light guides generally perpendicularly between the top and bottom planar surfaces, the light guides being arranged with their first and second surfaces disposed coplanar with the top and bottom planar surfaces, respectively, so as to provide an inner gap between adjacent light guides, wherein each inner gap has a generally isosceles triangular or generally isosceles trapezoidal gap profile and a spacing S as measured between the first edges of the adjacent light guides, and wherein an outer gap around the periphery of the outermost light guides is defined by the plane of the top planar surface, the outer sides of the outermost light guides and the peripheral boundary;

b. providing an optical isolation frame comprising a frame of interconnected slats made of an opaque material, wherein the slats are arranged and profiled to correspondingly match the respective arrangement and profiles of the inner gaps and outer gap of the light guide array, wherein the frame comprises one or more inner slats each corresponding to a respective inner gap and one or more outer slats corresponding to the outer gap, wherein each inner slat has a generally isosceles triangular or generally isosceles trapezoidal inner slat profile and each outer slat has a generally right triangular or generally semi-trapezoidal outer slat profile; and c. bonding the light guide array and the optical isolation frame to each other such that the slats in the optical isolation frame are disposed within their corresponding gaps in the light guide array.

12. A method according to claim 11, further comprising the steps of:

d. forming one or more trenches in the bottom planar surface of the light guide assembly, wherein each trench runs along and is generally centered with respect to a respective one of the inner gaps, and wherein each trench extends to a depth at least reaching the optical isolation frame; and e. covering the trench surfaces with a reflective material.

13. A method according to claim 11, further comprising the step of:

f. placing an opaque barrier on the bottom planar surface of the light guide assembly along each inner gap between adjacent light guides.

14. A method according to claim 11, wherein step (a) or (b) is performed simultaneously with step (c).

15. A method according to claim 14, wherein the simultaneous steps are performed by injection over-molding.

16. A method according to claim 11, wherein a first one of the light guide array and the optical isolation frame is injection molded, and then the other of the light guide array and the optical isolation frame is injection over-molded onto the first one so as to bond the light guide array and the optical isolation frame to each other.

17. A method according to claim 11, wherein steps (a) and (b) are performed separately and step (c) is performed by use of adhesive, mechanical interlocking or ultrasonic welding.

18. A light guide assembly for conveying light from each of plurality of scintillators to a respective each of a plurality of photosensors in a radiation detector, the light guide assembly having a top planar surface and a bottom planar surface generally parallel to the top surface, comprising:

an array of generally frustum-shaped light guides made of a light-transmissive material, each light guide having a first major planar surface having a first surface area and a first edge thereabout, a second major planar surface generally parallel to the first surface and having a second surface area which is greater than the first surface area, and a thickness T between the first and second surfaces, the array being bounded by the top planar surface, the bottom planar surface and a peripheral boundary extending about the light guides generally perpendicularly between the top and bottom planar surfaces, the light guides being arranged with their first and second surfaces disposed coplanar with the top and bottom planar surfaces, respectively, so as to provide an inner gap between adjacent light guides, wherein each inner gap has a generally triangular or generally trapezoidal gap profile and a spacing S as measured between the first edges of the adjacent light guides, and wherein an outer gap around the periphery of the outermost light guides is defined by the plane of the top planar surface, the outer sides of the outermost light guides and the peripheral boundary; and an optical isolation frame comprising a frame of interconnected slats made of an opaque material, wherein the slats are arranged and profiled to correspondingly match the respective arrangement and profiles of the inner gaps and outer gap of the light guide array;

wherein the light guide array and optical isolation frame are bonded to each other such that the slats of the optical isolation frame are disposed within their corresponding gaps in the light guide array.

19. A light guide according to claim 18, wherein a substantially reflective layer is disposed between the light guides and the frame slats for reflecting light back into the light guides.

20. A light guide according to claim 18, wherein one or more trenches are formed in the bottom planar surface of the light guide assembly with each trench running along and is generally centered with respect to a respective one of the inner gaps, wherein each trench extends to a depth at least reaching the optical isolation frame, and wherein the trench surfaces are covered with a reflective material.

* * * * *